3,213,060
POLYCARBONATE PURIFICATION

Winston J. Jackson, Jr., Kenneth P. Perry, and John R. Caldwell, Kingsport, Tenn., assignors to Eastman Kodak Company, Rochester, N.Y., a corporation of New Jersey
No Drawing. Filed Sept. 14, 1961, Ser. No. 137,970
12 Claims. (Cl. 260—47)

This invention relates to purification of polycarbonate products. More particularly the invention relates to methods for purifying solid polycarbonates produced by interfacial polycondensation processes.

An object of the invention is to provide a simplified procedure for washing solid polycarbonate particles produced by an interfacial polycondensation process.

It is well known that useful polyesters including polycarbonates can be produced by an interfacial polycondensation process in which a diacid chloride dissolved in a water-immiscible organic solvent phase and a bisphenol suspended in an alkaline aqueous phase condense to form a high molecular weight polymer when the two immiscible phases are intimately contacted. Such reactions are discussed by Schnell in Angew. Chemie 68, 633–660 (1956), and by P. W. Morgan in Society of Plastics Engineers Journal, 15, 485–495 (1959).

As the polycarbonate polymer is formed it may dissolve in the organic solvent phase or it may precipitate from the reaction mixture. When it precipitates it may be isolated by filtration. When it is dissolved in the solvent phase, the usual procedure for separating the polymer is first to separate the water-immiscible phase from the aqueous phase and then either to precipitate the polymer by adding a non-solvent to the solution, or simply to evaporate the solvent leaving a solid. The usual procedure for purifying the solid polymer is to redissolve the solid particles in a water-immiscible solvent, wash this solution with water, and then re-precipitate the polymer. The usual impurities found in the polycondensation product are sodium chloride, sodium salt of the acid used to neutralize the reaction mixture, and unreacted bisphenol.

We have found that the polycarbonate product can be purified without redissolving by washing solid particles of the polymer in a solvent mixture which contains water and a water-immiscible organic swelling agent which will slightly swell, but not dissolve, the polymer particles. Preferably particles to be washed should be of a size small enough to pass through a 40-mesh screen, or if the particles are porous, small enough to pass a 20-mesh screen. Larger particles may be ground to suitable size before washing. To prevent coagulation it is preferable to maintain slight acidity in the solvent mixture, as with 0.2–1.0% acetic acid. A convenient way to wash the particles is to stir them in a bath of the solvent mixture for 1–4 hours. Better purification is obtained by repeating the washing in a fresh solvent mixture for another 1–2 hours.

When solid polymer particles are washed, it is necessary that the solvent get inside the particles to remove impurities. This is accomplished by using a swelling agent which will cause the polymer particles to swell but not dissolve. If the agent has too much swelling effect, the polymer particles will stick together and prevent effective washing. Preferably the swelling agent should also be able readily to dissolve the bisphenol used in the polymerization. Swelling agents which fulfill these requirements for many polycarbonates are esters of carboxylic acids, such as ethyl acetate, isopropyl acetate, butyl acetate, methyl propionate, etc. Other satisfactory swelling agents for some polycarbonates are water immiscible ketones (e.g. cyclohexanone, cycloheptanone, methyl amyl ketone, diethyl ketone) and water immiscible ethers (e.g. diethyl ether, dipropyl ether). Water immiscible mixtures of swelling agents and solvents or non-solvents may also be used. If more swelling of the polymer is needed, some methylene chloride, ethylene dichloride, benzene, or toluene may be added with the swelling agent in the solvent mixture. If less swelling is desired, cyclohexane or naphtha may be added. If all of the bisphenol has been reacted and the principal impurities are inorganic, mixtures of methylene chloride and hexane or ethylene dichloride and cyclohexane may be used to give the swelling effect, and the water will dissolve the inorganic salts.

An effective method for testing the effectiveness of the washing is to measure the amount of haziness in a methylene chloride dope of the polymer. It was found that several washings with various solvents (hot and cold) and with hot water were ineffective in purifying a polymer to the extent that it would dissolve in methylene chloride as a clear dope solution. Inorganic salts were present which could be removed only by stirring the polymer simultaneously with a swelling agent and water.

The following examples illustrate specific embodiments of the invention.

Example I

A polycarbonate was prepared from 4,4'-(hexahydro-4,7-methanoidan-5-ylidene)-diphenol and phosgene by an interfacial polycondensation process in which tiny polymer particles were obtained as a precipitate from the reaction mixture. A 10-g. portion was passed through a 20-mesh screen and stirred for 4 hours at room temperature with a mixture containing 50 ml. of isopropyl acetate, 50 ml. of water, and 1 ml. of acetic acid. After washing, the polymer was separated by filtration and then was stirred for 2 hours longer in a fresh solvent mixture having the same composition. After polycarbonate was collected and dried it produced a clear dope in methylene chloride.

Example II

Using the solvent mixture of Example I a polycarbonate prepared from 4,4'-isopropylidenediphenol (Bisphenol A) and phosgene was washed twice with the solvent mixture, stirring for 1 hour at each treatment. After drying, the 20-to-40-mesh polymer particles gave a clear dope in methylene chloride.

Example III

A polycarbonate was prepared from 4,4'-(2-norcamphanylidene) diphenol and 2,5-norcamphanediol bischloroformate by an interfacial polycondensation method in which the polymer dissolved in the methylene chloride phase. The methylene chloride phase was separated from the aqueous phase, and the methylene chloride was evaporated. The polymer residue was ground in a ball mill to pass a 40-mesh screen. A 10-gram portion was stirred for 2 hours at room temperature with a solvent mixture containing 40 ml. diethylketone, 10 ml. cyclohexane, 50 ml. water, and 0.5 ml. acetic acid. The polymer was separated by filtration and stirred for 2 hours longer with the same amounts of the same solvents fresh. After drying, the polycarbonate gave a clear dope in methylene chloride.

Example IV

A solvent mixture containing 25 ml. of methyl propionate, 25 ml. of heptane, 50 ml. of water, and 1 ml. of acetic acid was used for washing 10 g. of a polycarbonate prepared from 4,4'-(2-norcamphanylidene)bis(2,6-dichlorophenol) and phosgene. This polymer was obtained as 20-to-40-mesh particles by an interfacial polycondensation process. After the polymer was stirred twice with a fresh solvent mixture for 2 hours at room temperature, it gave a clear dope in methylene chloride.

*Example V*

A solvent mixture containing 40 ml. of dipropyl ether, 10 ml. of toluene, 50 ml. of water, and 1 ml. of acetic acid was used for washing 10 g. of a polycarbonate prepared from 4,4'-(3-methyl-2-norcamphanylmethylene) diphenol and phosgene. This polymer was obtained as 40-mesh particles by an interfacial polycondensation process. After the polymer was stirred twice with a fresh solvent mixture for 2 hours at room temperature, it gave a clear dope in methylene chloride.

*Example VI*

A solvent mixture containing 20 ml. of methylene chloride, 30 ml. of hexane, 50 ml. of water and 1 ml. of acetic acid was used for washing 10 g. of a polycarbonate prepared from 4,4'-isopropylidenediphenol and phosgene. This polymer was obtained as 20-to-40-mesh particles by an interfacial polycondensation process. After the polymer was stirred twice with a fresh solvent mixture for 2 hours at room temperature, it gave a clear dope in methylene chloride.

The examples in the above description are given as specific embodiments to illustrate the invention and should not be construed to limit the scope of the invention as defined in the following claims.

We claim:

1. A method for purifying a bisphenol polycarbonate product of an interfacial polycondensation process comprising the steps of
    (1) separating said polycarbonate product as solid particles from said polycondensation reaction mixture,
    (2) agitating said particles in a washing mixture comprising water and a co-active purification agent which is selected from the group consisting of esters of monocarboxylic acids, ketones and ethers, said co-active agent being further characterized in that it is (a) water-immiscible, (b) a swelling agent for said particles, (c) said particles are not soluble therein, and (d) it is a solvent for said bisphenol,
    (3) separating said particles from said washing mixture whereby said purified polycarbonate product is characterized in that it can be dissolved in methylene chloride to form a clear dope.

2. The method of claim 1 wherein said particles will pass through a 20-mesh screen.

3. The method of claim 1 wherein said co-active agent is selected from the group consisting of ethyl acetate, isopropyl acetate, butyl acetate, methyl propionate, cyclohexanone, cycloheptanone, methyl amyl ketone, diethyl ketone, diethyl ether, and dipropyl ether.

4. The method of claim 1 wherein said solvent mixture further comprises an additional ingredient selected from the group consisting of heptane, cyclohexane and naphtha.

5. The method of claim 1 wherein said solvent mixture further comprises an additional ingredient selected from the group consisting of methylene chloride, ethylene dichloride, benzene and toluene.

6. The method of claim 1 wherein said solvent mixture further comprises an additional ingredient consisting of from 0.2 to 1.0% of an acid.

7. The method of claim 6 wherein said acid is acetic acid.

8. The method of claim 7 wherein said co-active agent is isopropyl acetate, and said bisphenol is 4,4'-(hexahydro-4,7-methanoindan-5-ylidene) diphenol.

9. The method of claim 7 wherein said co-active agent is isopropyl acetate, and said bisphenol is 4,4'-isopropylidenediphenol.

10. The method of claim 7 wherein said co-active agent is diethyl ketone and cyclohexane is present as an additional ingredient, and said bisphenol is 4,4'-(2-norcamphanylidene) diphenol.

11. The method of claim 7 wherein said co-active agent is methyl propionate and heptane is present as an additional ingredient, and said bisphenol is 4,4'-(2-norcamphanylidene) bis (2,6-dichlorophenol).

12. The method of claim 7 wherein said co-active agent is dipropyl ether and toluene is present as an additional ingredient, and said bisphenol is 4,4'-(3-methyl-2-norcamphanylmethylene) diphenol.

References Cited by the Examiner

UNITED STATES PATENTS

| | | | |
|---|---|---|---|
| 2,997,459 | 8/61 | Schnell | 260—47 |
| 3,023,101 | 2/62 | Ossenbrunner | 260—47 |
| 3,028,365 | 4/62 | Schnell | 260—47 |
| 3,030,335 | 4/62 | Goldberg | 260—47 |
| 3,038,879 | 6/62 | Laakso | 260—47 |
| 3,046,255 | 7/62 | Strain | 260—47 |

OTHER REFERENCES

J. Poly. Sci., vol. 40, pages 399–406 (1959).

MURRAY TILLMAN, *Primary Examiner.*

HAROLD N. BURSTEIN, *Examiner.*